2,977,237

MOLD LUBRICANT COMPOSITION

Ernest R. Vierk, Lansing, and Charles A. Mazzoni, Jr., Harvey, Ill., assignors to Sinclair Refining Company, New York, N.Y., a corporation of Maine No Drawing. Filed Dec. 27, 1957, Ser. No. 705,512

7 Claims. (Cl. 106—38.25)

The present invention relates to a new composition of matter finding particular utility as a mold lubricant. More specifically, the present invention resides in providing an improved emulsifiable oil composition having suspended therein colloidal graphite, said composition providing, upon emulsification with water a superior glass mold lubricant.

The manufacture of glassware articles such as glasses, bottles, jars, etc. has developed into an extensive art with a great variety of machines and processes for forming the different articles. While the details of such machines and processes may vary to a great extent, the overall process and apparatus may be represented by the following description of a typical glass molding operation for making bottles. The ingredients of the glass, i.e. silica, etc. can be automatically charged into a furnace wherein they are heated to a temperature of about 2600 to 2800° F. to form the molten glass. The thus formed molten glass is forced through openings in the furnace and cut into desired sizes or "gobs" by lubricated shears. The glass gobs are delivered through lubricated troughs to a split cast iron mold known as the blank mold. In this preliminary blank mold the neck of the bottle is formed by a partial air blow. The split mold then opens and a mechanical arm picks up the partially formed bottle, inverts it and delivers it to another split mold known as the finishing or air blow mold. Here under a pressure of about 40 p.s.i. the final air blow forms the bottle. The finished bottle is then placed on a conveyor which carries it to the lehr where it is annealed. The bottle upon leaving the lehr is given a final inspection and then boxed for shipment.

In order to facilitate the ready removability of the partially formed and completely formed bottle from the split molds, the molds must be sprayed or swabbed with a lubricant before each injection of a glass gob. Generally, a lubricant to be useful at this point in the manufacture of glass articles should have embodied therein the following characteristics: (1) effective deposit of the release agent, e.g. graphite, vermiculite, mica, etc., (2) reduction or elimination of smoke and fire hazards usually occasioned by the vaporization of one or more components of the lubricant on contact with the hot mold, (3) minimum build up of ash in the molds which might tend to produce dimensional changes in the glass article or deface the glass surface resulting in a large number of rejects and (4) complete dispersion of the release agent in the mold lubricant so that uniform lubrication of mold surfaces can be attained. Generally, the lubricant compositions in commercial use today, which are comprised of a major part of a mineral oil base having suspended therein a solid lubricant such as graphite, have serious shortcomings with respect to one or more of the desired characteristics, particularly in regard to the formation of dense clouds of smoke occasioned by the vaporization of the lubricating base oil resulting in the formation of oily layers on the machine and superstructure with the accompanying hazards of fire.

In accordance with the present invention we have provided an emulsifiable oil composition which upon emulsification with water will yield a superior glass mold lubricant embodying all of the above desirable features and being particularly characterized by a notable reduction in smoke and oily vapor formation upon contact with the hot molds. The emulsifiable oil composition of the present invention comprises as its base constituent a neutral petroleum oil and about 1 to 50% by weight of an oil-soluble heavy mineral lubricating oil fraction preferably having a viscosity of at least above 500 SUS at 210° F., about 1 to 40% by weight of a colloidal deflocculated graphite suspended in a neutral petroleum oil, about 1 to 10% by weight of a non-ionic surface active polyoxyethylene derivative of hexitol anhydride partial long chain fatty acid ester, about 0.1 to 2% by weight of a non-ionic surface active long chain fatty acid partial ester of hexitol anhydride, about 0.1 to 4% by weight of a non-ionic surface active fatty acid ester of a polyhydric alcohol and about 5 to 25% by weight of an alkylaryl polyether alcohol. The present composition can also have an anionic surface active agent such as about 0.5 to 5.0% by weight of an ethylene diamine sulfonate, or other ashless sulfonate anionic surface active agent, incorporated therein if the emulsion stability is impaired by the hardness of the water used to form the lubricant emulsion. The neutral oil base is substantially the remaining part of the composition generally being at least about 25% of the composition.

The composition of the present invention is readily prepared by dispersing the components in the petroleum oil base. Advantageously a slightly elevated temperature, e.g. about 100 to 175° F. can be employed to enhance uniformity of mixture. In order to obtain the desired uniformity, it is advantageous to blend the ingredients in the following sequence of steps. The base oil is elevated to the desired temperature, e.g. 150° F., and the heavy lube fraction added thereto. After thorough mixing the "graphite suspension" is included and the mixing continued until uniformity is obtained. Finally the emulsifiers are added and the entire mixture blended by passing through a homogenizer. Although the above procedure is our preferred sequence of blending the ingredients, it is, of course, possible to mix all the ingredients at one time, elevate the temperature to that desired and then effect the mixing.

In use as a mold release agent as described above the composition of the present invention can be dispersed in about 1 to 100 parts of water depending upon the particular application for which it is intended. We have found, however, that advantageous results can be obtained in most glass molding processes when using a ratio of about 1 part of the oil composition to about 10 to 40 parts of water and preferably the ratio should be about 1 to 20.

The petroleum base oil for use in my emulsifiable oil composition can be any distillate or neutral mineral oil of lubricating viscosity. Preferably the base oil will have a viscosity of about 50 to 1200 SUS at 100° F., more preferably about 100 to 600 SUS at 100° F. It can be highly refined such as white oil or lightly refined as by distillation, solvent extraction or clay or chemical treatment. Tests indicate that the lower the vapor pressure of the base oil within the neutral oil range the greater the graphite deposition. However, it was further noted in conjunction with this that the lower the vapor pressure and higher the viscosity the more difficult the oil was to emulsify. In arriving at a satisfactory base oil for use in the present composition both of these points must be kept in mind and a compromise reached therebetween. We have found that the preferred base oil is one derived from an acid-refined naphthenic neutral and having a viscosity of 100 SUS at 100° F., hereinafter referred to as oil A.

Since non-colloidal graphite tends to separate from the emulsifiable oil or the emulsion upon storage it is advantageous to use graphite colloidally suspended in a carrying medium. Moreover, due to the scouring effect of steam on the deposited graphite at the elevated temperature, e.g. 700° F., it is desirable that the graphite be suspended in an oil-based carrier rather than a water-based carrier. Furthermore, it was learned that even some oil-based carriers were not as effective as others in providing for the depositing of the solid lubricant. Due to the various considerations we have found that the type of colloidal suspended graphite known as "Oildag" produced by Acheson Colloids Company gives the best results when used in the present invention. This material is a suspension of about 10% graphite in a neutral petroleum oil carrier of lubricating viscosity, the graphite particles being electrically suspended in the oil carrier by like charges on each graphite particle. The "graphite suspension" will generally comprise about 1 to 40% of our emulsifiable composition, and the suspension may contain about 5 to 40% of graphite. Preferably the suspension will be present in amounts of about 20% by weight of the composition.

A commercially available material which is a polyoxyalkylene derivative of hexitol anhydride partial long chain fatty acid ester and which can be used in the present invention is marketed as "Tween 85" a product of the Atlas Powder Company. Tween 85 is the reaction product of about 5 mols of ethylene oxide and one mol of sorbitan trioleate and is an oily liquid at 25° C. having a flash point of about 565° F., a fire point of about 645° F. and a specific gravity of about 1.00 to 1.05. Such reaction products containing from about 2 to 25 mols or more ethylene oxide per mol of the ester are especially preferred.

"Span 20" is a commercially available (Atlas Powder Company) example of the long chain fatty acid partial ester of hexitol anhydrides which can be used in our invention and comprises essentially sorbitan monolaurate. Span 20 is an oily liquid having a flash point of about 400° F., a fire point of about 440° F. and a specific gravity of about 1.00 to 1.06. The long chain fatty acids which are employed in producing both the fatty acid partial esters of hexitol anhydrides and their polyalkylene derivatives contain about 12 to 24 carbon atoms per molecule. The acids can be saturated or unsaturated and include, for example, lauric, palmitic, stearic and oleic acids. By "hexitol anhydride" is meant inner esters having one cyclic oxygen per ring derived from hexahydric alcohol by intermolecular condensation and includes the mono-, anhydro- and dianhydro derivatives, i.e. hexides, hexitans, mannides, mannitans, and the like. By "partial ester" is meant that the hydroxy groups of the anhydride are not all esterified; mono-, di- and tri-esters and mixtures thereof are preferred and these can be simple or mixed esters.

The non-ionic surface active fatty acid esters of the polyhydric alcohol can advantageously be a polyethylene glycol dilaurate having a molecular weight of about 400 although similar materials of higher or lower molecular weight can be used if desired, e.g. polyethylene glycol 400 mono-oleate. They can be prepared by treating the fatty acids with ethylene oxide or by esterifying the appropriate glycols. The fatty acid portion of the ester should normally be one having about 12 to 18 carbon atoms in its molecule, and generally the polyethylene glycol ester has a molecular weight of about 200 to 600.

Particularly satisfactory alkylaryl polyether alcohols which can be employed in the present invention are available commercially from the Rohm and Haas Company and are known by the name of "Tritons." These compounds comprise alkylaryl polyether alcohols having the general formula R—(O—CH$_2$—CH$_2$)$_n$—OH wherein R is an alkylaryl radical and $n$ is an integer from about 1 to 30 or more and preferably about 1 to 20. The alkylaryl radical advantageously is essentially a lower alkyl benzene derivative such as the xylenes, durene and methylethyl benzene. A particular Triton compound employed in the present composition is "Triton 45" which is composed of a tertiary octyl benzene alkylaryl group and the chain length given by $n$ being about 5. It is, of course, possible to use similar compounds such as "Triton 100" which is the same as "Triton 45" only having an average chain length of about 10 ether radicals.

The incorporation of the oil-soluble heavy mineral oil lubricant fraction in the present composition greatly promotes the graphite laydown characteristics of the lubricant composition. The heavy lube can be a propane insoluble resin of a paraffinic-based crude or an aromatic extract of a residual lubricating oil. The resin should have a viscosity of at least above 500 SUS at 210° F. and preferably at least about 5000 SUS at 210° F. As stated the heavy lube fraction can also be obtained as an aromatic extract of a residual lube oil, e.g. bright stock, through the use of a solvent selective for aromatic constituents of the oil such as phenol, furfural, etc. After the extraction the solvent is removed from the extract to give the desired aromatic fraction. Preferably, the aromatic fraction has a viscosity of at least about 500 SUS at 210° F. and can be derived from oils of the various crudes, e.g. Mid-Continent or Pennsylvania (paraffinic) crudes.

As indicated previously an anionic surface active agent may be desirable at times depending upon the hardness of the water which is used to form the emulsion. Generally we have found that the amine-neutralized alkyl aromatic sulfonates, and particularly ethylene diamine dinonyl naphthalene sulfonate will effectively combat hard water and will render the emulsion stable in water having a hardness of 400 p.p.m.

An emulsifiable oil composition of the present invention can be represented by the formulation set forth in Table I below. This formulation however is not to be considered as limiting the scope of the present invention.

*Table I*

| | Percent |
|---|---|
| Neutral petroleum oil A | 42.50 |
| Oil-soluble heavy lube fraction [1] | 15.00 |
| Oildag | 20.00 |
| Triton X–45 | 13.75 |
| Tween 85 | 5.00 |
| Polyethylene glycol 400 dilaurate | 1.00 |
| Span 20 | .25 |
| Ethylene diamine dinonyl naphthalene sulfonate, 50% active component in mineral oil | 2.50 |
| | 100.00 |

[1] Propane insoluble Pennsylvania resin having a viscosity of about 7500 SUS at 210° F.

The properties of this formulation are:

| | |
|---|---|
| Gravity, ° API | 16.3 |
| Flash, ° F. | 320.0 |
| Fire, ° F. | 370.0 |
| Viscosity, SUS, at 100° F. | 868.0 |
| Viscosity, SUS, at 210° F. | 79.2 |
| Carbon residue, percent | 5.18 |

Storage stability tests conducted over a period of nine days at temperatures of 40° F., 80° F. and 130° F. showed no noticeable separation of the graphite.

A suitable emulsion for lubricating glass molds can be prepared by homogenizing about 1 part of the above oil composition with about 20 parts of water. The emulsion formed in this manner was subjected to a spray panel test and an emulsion stability test in order to determine its graphite depositing characteristics and its ability to maintain the graphite in suspension over extended periods of time. The spray panel test was conducted as follows: A steel panel measuring 2" x 1¼" x 3/32" was used as a test specimen. Before the test the steel panel was sanded and then cleaned with a solvent. After cleaning, the panel was heated on a hot plate for approximately 3 to 5 minutes to a temperature of about 600 to 800° F. The temperature of the panel was measured by employing a Chrome-Alumel thermocouple welded to the surface of a test panel. After the panel was heated it was sprayed with the above formulation by use of a paint spray gun adjusted to deliver about 15 p.s.i. of pressure. After spraying the panel was allowed to cool and finally a portion of the specimen was wiped in order to observe the graphite deposition. The above formulation showed a heavy, uniformly distributed graphite deposit. Various other formulations having a heavy lube fraction were subjected to substantially the same test as described above. The results of these tests and the components of the compositions are reported in Table II below.

*Table II*

| Composition | Percent | Results |
| --- | --- | --- |
| Neutral petroleum oil A | ¹ Balance | |
| Oildag | 20.0 | |
| Emulsifiers ² | 15.0 | |
| Heavy lube fraction | (¹) | |
| (a) None | | Light. |
| (b) Extract I | 30 | Very light. |
| (c) Extract II | 30 | Do. |
| (d) Extract III | 30 | Medium heavy. |
| (e) Propane insoluble resin from Mid-Continent crude. | 15 | Very light. |
| (f) Air-blown asphalt | 15 | Poor; stains. |
| (g) Pennsylvania light resin ³ | 5 | Light Medium. |
| (h) Pennsylvania light resin ³ | 15 | Medium. |
| (i) Pennsylvania heavy resin ³ | 5 | Do. |
| (j) Pennsylvania heavy resin ³ | 15 | Heavy. |
| (k) Pennsylvania extra heavy resin ³ | 5 | Medium. |
| (l) Pennsylvania extra heavy resin ³ | 15 | Heavy. |

¹ Adjusted base oil composition for varied percentage of heavy lube fraction.
² The emulsifiers of Table II were combined in substantially the same ratios as set forth in Table I.
³ The Pennsylvania resins were propane insoluble and had the following approximately SUS viscosities at 210° F.:
Light _____ 400–750
Heavy _____ 7,500
Extra Heavy _____ 11,000

The heavy lube fractions in compositions b through l in the above table were as follows: Extract I was an aromatic extract of about 90 SUS at 210° F. derived predominantly by phenol extraction of a Mid-Continent lubricant distillate; Extract II is an aromatic extract from a phenol extraction of a Mid-Continent lubricant distillate and the extract had a viscosity of about 175 SUS at 210° F.; Extract III is an aromatic extract from a phenol extraction of a Mid-Continent deasphalted bright stock oil and the extract had a viscosity of about 540 SUS at 210° F. The air-blown asphalt is a blend of a propane precipitated asphalt of a Mid-Continent crude having a needle penetration of about 20 (0.01 cm./unit) at 77° F. and reduced Mid-Continent crude asphalt having a penetration of about 275 (0.01 cm./unit) at 77° F. The asphaltic blend had a viscosity of about 1000 furol seconds at 210° F. The blend is heated to a temperature of about 500° F. and then blown with air until a softening point of between 200 and 210° F. is attained. As can be seen from the results reported in Table II above, only the Pennsylvania resins and the aromatic extract of the residual lube oil, e.g. bright stock, proved beneficial in promoting the graphite lay-down or deposition.

The above emulsion of this invention also displayed good stability even when the emulsion was formed with water having a hardness of 400 p.p.m. However, it was found that when using water of this hardness the incorporation of the ethylene diamine dinonyl naphthalene sulfonate was advantageous. The procedure and the results of the emulsion stability test were as follows: 100 cc. of the 1–20 oil to water emulsion were placed in a test tube and allowed to settle for a period of 24 hours. Upon the expiration of the 24 hour period the contents of the test tube were examined visually and the cuff measured with a ruler. The following results were noted:

| Hardness, parts/million | Above Composition Minus Ethylene Diamine Sulfonate | Above Composition Including The Sulfonate |
| --- | --- | --- |
| 0 | 2 mm. graphite cuff | 3 mm. graphite cuff. |
| 200 | graphite separates and emulsion breaks. | 2 mm. graphite cuff. |
| 400 | do | Do. |

Thus the composition as represented by the above formulation displays the optimum qualities between emulsifiability and graphite deposition ability and represents our preferred composition for normal glass mold operation.

An emulsion substantially as described above in Table I was tested as a glass mold lubricant in a Hartford Empire 1S machine producing one quart beer bottles. The lubricant was introduced into the machine molds by a bent coopper tube located 6 to 8 inches above the mold. The lubricant collected in the tubing and before each injection of glass gob a charge of air was blown into the tubing, thus spraying the interior of the molds with the lubricant. This lubricant was successfully used in the manufacture of the one quart beer bottles for more than 24 hours. The production rate and number of rejects was about average with a notable reduction in the amount of smoke and oily vapors produced as a result of the lubricant contact with the hot molds.

The above emulsion was also employed in a similar type machine producing one-gallon jugs. In this operation the copper tubing supplying the lubricant was replaced by an aluminum nozzle having three holes drilled therein. The nozzle was located on the invert part of the machine and when the blank mold opened the spray was directed into the entire mold. Normal production of the one-gallon jug was continued for more than six days with very little carbon build up noted in the molds and with a substantial reduction in the amount of smoke and oily vapours.

We claim:
1. An emulsifiable oil composition consisting essentially of about 1 to 50% by weight of an oil-soluble heavy mineral oil lube fraction selected from the group consisting of propane-insoluble resins derived from a paraffinic crude oil said resin having a viscosity of at least about 500 SUS at 210° F., and an aromatic extract of residual lubricating oil, said extract having a viscosity of at least about 500 SUS at 210° F., about 1 to 40% by weight of graphite electrically suspended in a neutral distillate petroleum oil, about 1 to 10% by weight of non-ionic surface active polyoxyethylene derivative of hexitol anhydride partial long chain fatty acid ester containing about 2 to 25 mols of ethylene oxide per mol of ester, about 0.1 to 2% by weight of a non-ionic surface active long chain fatty acid partial ester of hexitol anhydride, about 0.1 to 4% by weight of a non-ionic surface active fatty acid ester of polyethylene glycol, wherein the fatty acid portion of each of said partial esters contains about 12 to 18 carbon atoms per molecule, about 5 to 25% by weight of an alkylaryl polyethoxy alcohol containing about 1 to 20 ether groups, with substantially the remainder being neutral distillate petroleum oil.

2. An oil-in-water emulsion consisting essentially of about 1 to 100 parts of water to one part of the composition of claim 1.

3. An emulsifiable oil composition substantially as described in claim 1 wherein the oil-soluble heavy mineral oil fraction is a resin having a viscosity of at least about 5000 SUS at 210° F.

4. An oil-in-water emulsion consisting essentially of about 1 to 100 parts of water to one part of the composition of claim 3.

5. An emulsifiable oil composition consisting essentially of 1 to 50% by weight of an oil-soluble heavy mineral oil lube fraction selected from the group consisting of propane-insoluble resins derived from a paraffinic crude oil, said resin having a viscosity of at least about 500 SUS at 210° F., and an aromatic extract of a residual lubricating oil, said extract having a viscosity of at least about 500 SUS at 210° F., about 1 to 40% by weight of a graphite electrically suspended in a neutral distillate petroleum oil, about 1 to 10% by weight of non-ionic surface active polyoxyethylene derivative of hexitol anhydride partial long chain fatty acid ester containing about 2 to 25 mols of ethylene oxide per mol of ester, about 0.1 to 2% by weight of a non-ionic surface active long chain fatty acid partial ester of hexitol anhydride, about 0.1 to 4% by weight of a non-ionic surface active fatty acid ester of polyethylene glycol, wherein the fatty acid portion of each of said partial esters contains about 12 to 18 carbon atoms per molecule, about 5 to 25% by weight of an alkylaryl polyethoxy alcohol containing about 1 to 20 ether groups, about 0.5 to 5.0% by weight of an anionic surface active ethylene diamine naphthalene sulfonate with substantially the remainder being a neutral distillate petroleum oil having a viscosity of about 100 to 600 SUS at 100° F.

6. An emulsifiable oil composition substantially as described in claim 5 wherein the oil-soluble heavy mineral oil fraction is a resin having a viscosity of at least about 5000 SUS at 210° F.

7. An oil-in-water emulsion consisting essentially of about 1 to 100 parts of water and one part of the composition of claim 6.

References Cited in the file of this patent

UNITED STATES PATENTS

| | | |
|---|---|---|
| 1,524,872 | McLeod | Feb. 3, 1925 |
| 1,984,214 | Heitmann | Dec. 11, 1934 |
| 2,549,535 | Skooglund | Apr. 17, 1951 |
| 2,563,499 | Smith | Aug. 7, 1951 |
| 2,784,108 | Cupper | Mar. 5, 1957 |
| 2,846,232 | Oppliger | Aug. 5, 1958 |

OTHER REFERENCES

Atlas Publication "Surface Active Agents," pub. 1948 by Atlas Powder Co., Wilmington, Delaware (p. 38).